United States Patent
French et al.

(10) Patent No.: US 9,458,657 B2
(45) Date of Patent: Oct. 4, 2016

(54) SYSTEM AND METHOD FOR AUTOMATICALLY CLOSING A GARAGE DOOR

(71) Applicant: GBF Corp., Elk Grove Village, IL (US)

(72) Inventors: John Stuhr French, Arlington Heights, IL (US); Patrick Thomas Brennan, Arlington Heights, IL (US)

(73) Assignee: GBF CORP., Elk Grove Village, IL (US)

( * ) Notice: Subject to any disclaimer, the term of this patent is extended or adjusted under 35 U.S.C. 154(b) by 460 days.

(21) Appl. No.: 13/644,122

(22) Filed: Oct. 3, 2012

(65) Prior Publication Data

US 2013/0081329 A1    Apr. 4, 2013

Related U.S. Application Data

(60) Provisional application No. 61/542,637, filed on Oct. 3, 2011.

(51) Int. Cl.
*E05F 15/73* (2015.01)
*E05F 15/20* (2006.01)
*G08B 13/22* (2006.01)
*G05B 11/01* (2006.01)
*E05F 15/79* (2015.01)

(52) U.S. Cl.
CPC .......... *E05F 15/2092* (2013.01); *E05F 15/73* (2015.01); *E05F 15/79* (2015.01); *G05B 11/01* (2013.01); *G08B 13/22* (2013.01); *E05Y 2400/324* (2013.01); *E05Y 2900/106* (2013.01)

(58) Field of Classification Search
CPC .. E05Y 2900/106; E05F 15/73; E05F 15/79; G05B 11/01; G08B 13/22

USPC ....... 318/264–266, 272, 275, 277, 282, 286, 318/466–469, 626
See application file for complete search history.

(56) References Cited

U.S. PATENT DOCUMENTS

| | | | | |
|---|---|---|---|---|
| 2,262,719 | A * | 11/1941 | Collins | 318/256 |
| 3,577,080 | A * | 5/1971 | Cannalte | 340/13.36 |
| 3,805,096 | A * | 4/1974 | Hamilton, II | 307/116 |
| 4,536,755 | A * | 8/1985 | Holzgang | G08B 21/0446 200/61.52 |
| 5,357,183 | A * | 10/1994 | Lin | 318/468 |
| 5,510,686 | A * | 4/1996 | Collier | 318/446 |
| 5,789,868 | A * | 8/1998 | Sears | 315/149 |
| 6,118,243 | A * | 9/2000 | Reed et al. | 318/468 |
| 6,469,464 | B1 * | 10/2002 | McCall | 318/445 |
| 6,563,431 | B1 * | 5/2003 | Miller, Jr. | 340/932.2 |
| 7,355,363 | B2 * | 4/2008 | Angiuli | E05F 15/603 318/286 |
| 2003/0071590 | A1 * | 4/2003 | Roman | 318/282 |
| 2004/0135531 | A1 * | 7/2004 | Graham et al. | 318/442 |
| 2005/0176400 | A1 * | 8/2005 | Mullet et al. | 455/403 |
| 2008/0012515 | A1 * | 1/2008 | Murray | 318/466 |
| 2011/0227746 | A1 * | 9/2011 | Houser et al. | 340/686.1 |

* cited by examiner

*Primary Examiner* — Gregory Strimbu
(74) *Attorney, Agent, or Firm* — McAndrews, Held & Malloy, Ltd.

(57) ABSTRACT

Systems and methods for automatically closing a garage door can include one or more door open sensors, one or more motion sensors, one or more timers, and a door close activator. In certain embodiments, the one or more door open sensors are configured to detect whether the garage door is completely open. In various embodiments, the one or more motion sensors are focused in a garage and configured to detect motion within the garage. In certain embodiments, the one or more timers are configured to delay for a predetermined time period after motion is no longer detected. In various embodiments, the door close activator is configured to close the garage door after the delay of the predetermined period of time.

19 Claims, 7 Drawing Sheets

SYSTEM AND METHOD FOR AUTOMATICALLY CLOSING A GARAGE DOOR

CROSS-REFERENCE TO RELATED APPLICATIONS/INCORPORATION BY REFERENCE

This patent application makes reference to, claims priority to and claims benefit from U.S. Provisional Patent Application Ser. No. 61/542,637, entitled "Improved Automatic Closing Device for Garage Doors," filed on Oct. 3, 2011, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Certain embodiments provide a system and method for automatically closing a garage door. More specifically, certain embodiments provide an automatic garage door closing device configured to close a garage door once a predetermined period of time has lapsed after the garage door was opened and motion is no longer detected.

Typical overhead garage doors include a plurality of panels coupled by hinges that are guided by rollers along a system of tracks. Extension springs or a torsion spring system may be used to balance the weight of the door. Motorized garage door opening devices are commonly used to open and close garage doors. The motorized garage door opening devices are typically controlled by switches on the garage wall and remote controls, for example.

A common problem with a typical garage door system is that the garage door may be unintentionally left open by a user that is distracted or in a hurry, for example. Leaving a garage door open may attract uninvited guests to enter a garage or home of the user. Further, garage door system users may waste time having to circle back to double-check whether the user remembered to close the garage door. As such, automatic garage door closing devices improve the security of a garage and attached structures. Further, an automatic garage door closing device may give a user peace of mind by knowing that the garage door was closed automatically, even if the user forgot to activate the motorized garage door opening device (e.g., remote control or wall switch) to close the door.

Currently, automatic garage door closing devices typically employ a simple timer that automatically closes a garage door after the timer expires. However, such garage door timer devices may be difficult to install and do not ensure that the user, children or pets, for example, are clear of the door prior to closing the door. Security systems also exist that may allow a user to remotely check whether the user remembered to close the garage door and remotely close the door if the user forgot. However, such security systems are expensive, typically require professional installation, and may require user action to close the door.

As such, there is a need for an affordable, easy to install, automatic garage door closing device configured to close a garage door once a predetermined period of time has lapsed after the garage door was opened and motion is no longer detected.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments provide a system and method for automatically closing a garage door, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

The foregoing summary, as well as the following detailed description of certain embodiments of the present invention, may be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Various embodiments provide a system 100 and method 200 for automatically closing a garage door. The present technology provides a system and/or an automatic garage door closing device 100 configured to close 260 a garage door once a predetermined period of time has lapsed 230-250 after the garage door was opened 210 and motion is no longer detected 220-230.

Certain embodiments provide an automatic garage door closing system 100. The automatic garage door closing system 100 comprises one or more door open sensors 110, one or more motion sensors 120, one or more timers 130, 150, 160, and a door close activator 170. The one or more door open sensors 110 may be configured to detect whether a garage door is completely open. The one or more motion sensors 120 may be configured to detect motion. The one or more timers 130, 150, 160 may be configured to delay at least one predetermined period of time after the motion is no longer detected. The door close activator 170 may be configured to close the garage door after the delay of the predetermined period of time.

Various embodiments provide a method 200 for automatically closing a garage door. The method 200 may comprise detecting 210 the garage door is completely open using a door open sensor device 110. Further, the method 200 may comprise detecting 220 motion using a motion sensing device 120. The method 200 may also comprise triggering 230, 240, 250 one or more timers 130, 150, 160 after the motion has stopped. Also, the method 200 may comprise automatically closing 260 the garage door at the expiration of a predetermined time period associated with the one or more timers 130, 150, 160.

Certain embodiments provide a non-transitory computer-readable medium encoded with a set of instructions 200 for execution on a computer. The set of instructions 200 may comprise a door detection routine 210 configured to detect when a garage door is completely open. The set of instructions 200 may comprise a motion detection routine 220 configured to detect motion. The set of instructions 200 may comprise a timer routine 230, 240, 250 configured to delay a predetermined time period after the motion has stopped. The set of instructions 200 may comprise a close door routine 260 configured to close the garage door at the expiration of the predetermined time period.

Figure 1:
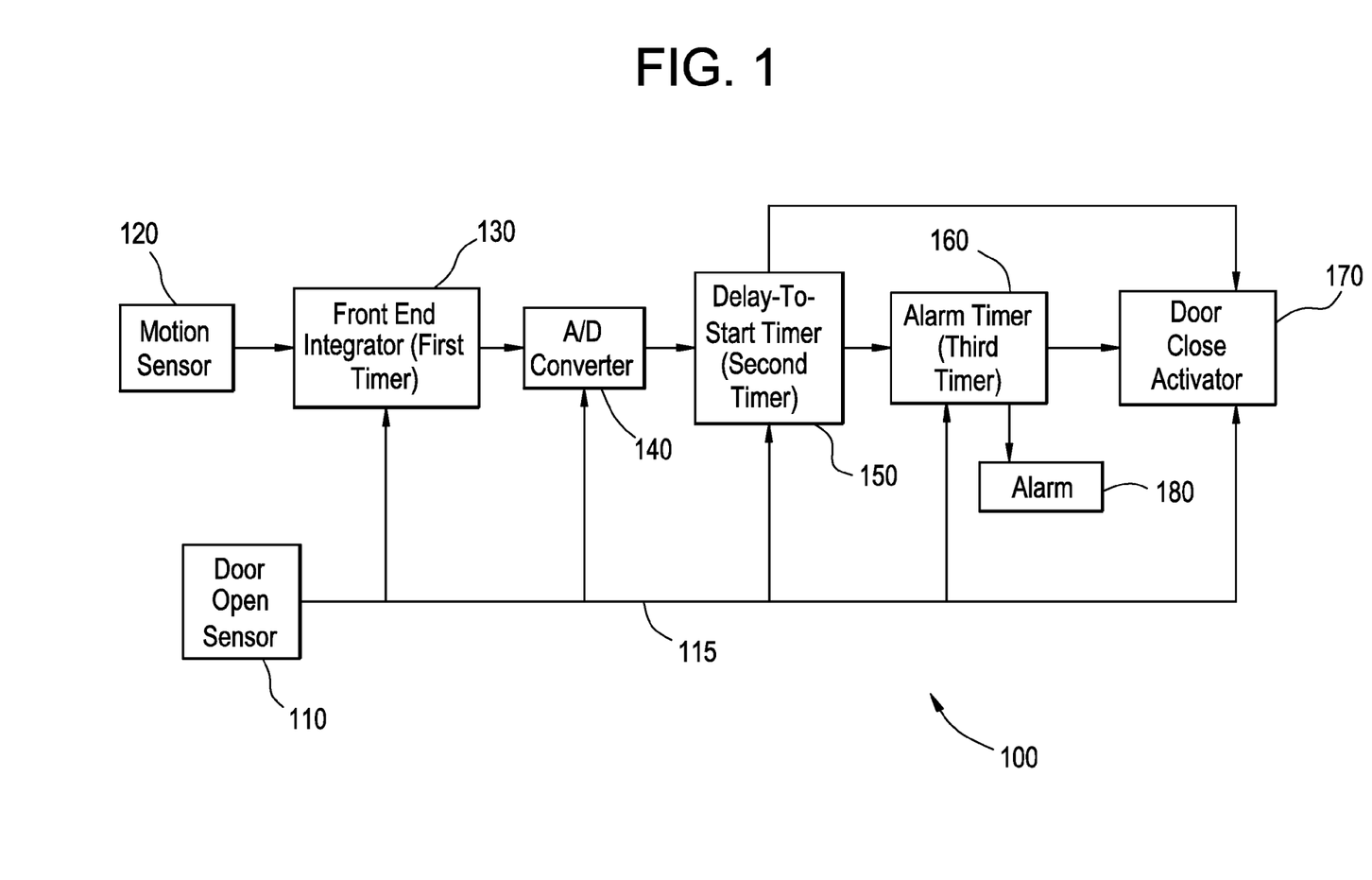
FIG. 1 is a diagram that illustrates an exemplary system for automatically closing a garage door, in accordance with an embodiment of the present technology.
Figure 7:
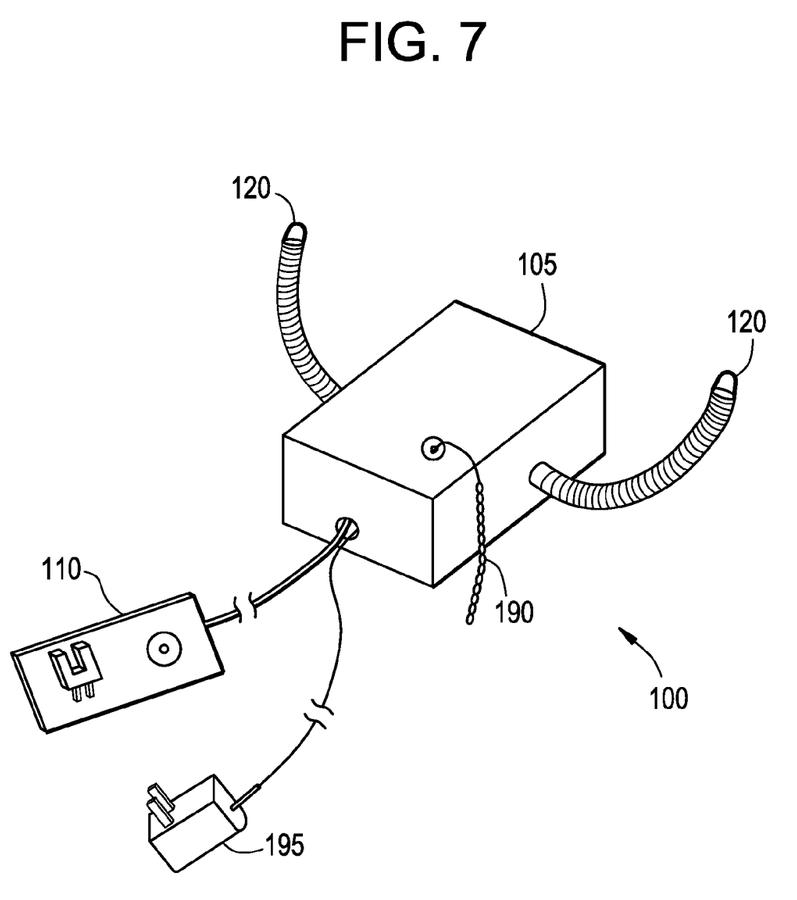
FIG. 7 illustrates an exemplary automatic garage door closing device, in accordance with an embodiment of the present technology.

FIG. 1 is a diagram that illustrates an exemplary system 100 for automatically closing a garage door, in accordance with an embodiment of the present technology. FIG. 7 illustrates an exemplary automatic garage door closing device 100, in accordance with an embodiment of the present technology.

Referring to FIGS. 1 and 7, the system 100 comprises a housing 105, door sensor(s) 110, motion sensor(s) 120, timer module(s) 130, 150, 160, a door close activation module 170, an on/off switch 190, and a power supply connector 195, for example. Certain embodiments provide an alarm 180 operable to provide audible tones, speech, or the like, prior to and/or while a garage door is closing. The modules of the system 100 may be implemented alone or in combination in various forms of hardware, firmware, and/or as a set of instructions in software, for example. In certain embodiments, the system 100 can be a stand-alone device that is retrofitted to, or otherwise connected with, an existing or separate garage door system 300. In various embodiments, the system 100 may be integrated into a single unit with a garage door system 300. The components of the system 100 may communicate via wired and/or wireless connections.

Figure 3:
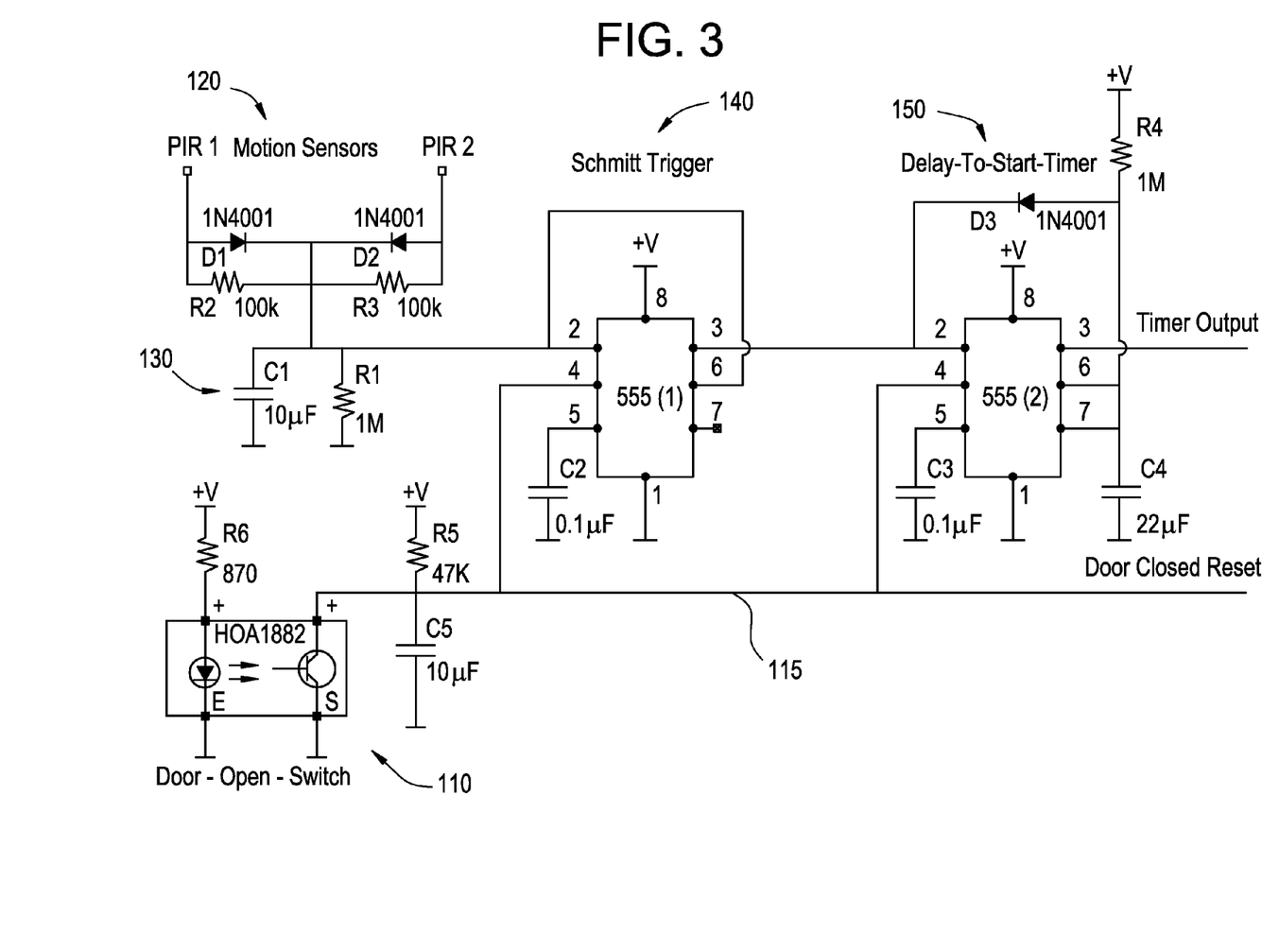
FIG. 3 is a diagram that illustrates exemplary circuitry for implementing components of the system for automatically closing a garage door of FIG. 1, in accordance with an embodiment of the present technology.
Figure 4:
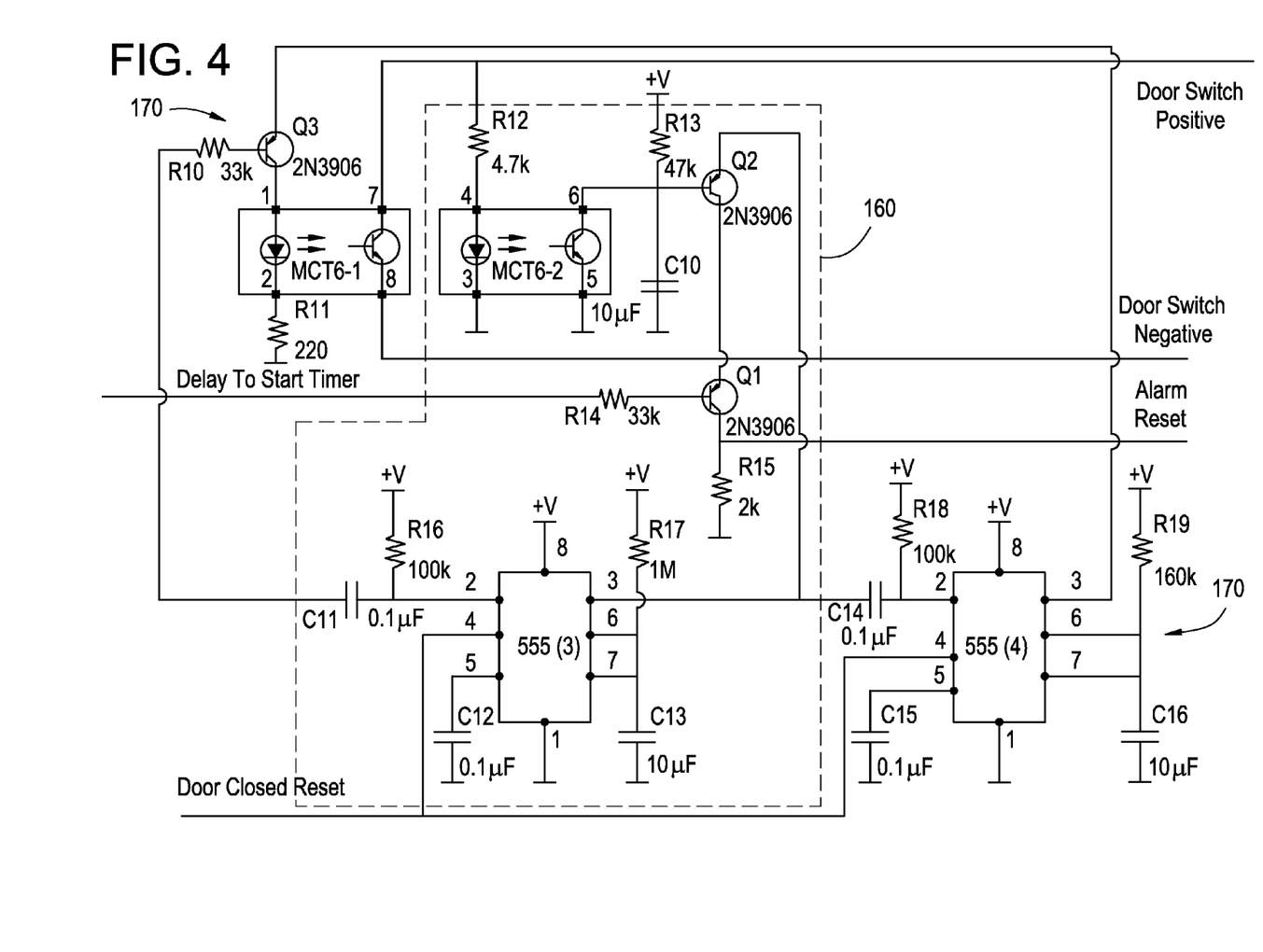
FIG. 4 is a diagram that illustrates exemplary circuitry for implementing components of the system for automatically closing a garage door of FIG. 1, in accordance with an embodiment of the present technology.
Figure 5:
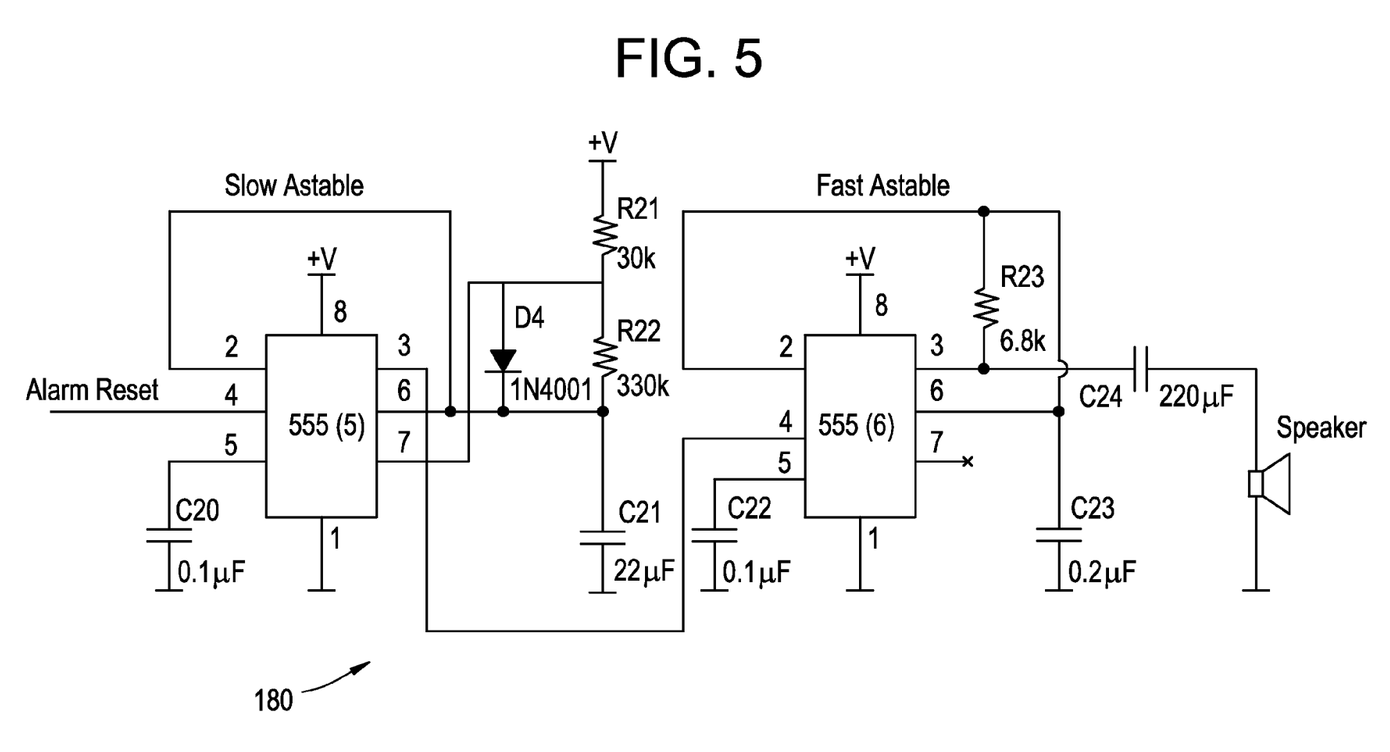
FIG. 5 is a diagram that illustrates exemplary circuitry for implementing components of the system for automatically closing a garage door of FIG. 1, in accordance with an embodiment of the present technology.

In various embodiments, the modules 130, 150, 160, 170 may comprise circuitry and the system 100 may include analog-to-digital converter circuitry 140. FIGS. 3-5 are diagrams that illustrate exemplary circuitry for implementing components of the system for automatically closing a garage door of FIG. 1, in accordance with an embodiment of the present technology, as discussed in more detail below. However, the present invention is not limited to the exemplary circuitry illustrated in FIGS. 3-5. The system housing 105 or a garage door system 300 housing may house the timer module circuitry 130, 150, 160, the analog-to-digital converter circuitry 140, the door close activation module circuitry 170, and the on/off switch 190 circuitry, among other things.

Certain embodiments may implement the modules 130, 150, 160, 170, among other things, as a set of instructions residing on a computer-readable medium, such as a memory or hard disk, for execution on a general purpose computer or other processing device, such as, for example, one or more dedicated processors. The computer-readable medium (not shown) and processing device (not shown) may be housed in the system housing 105 or integrated within a garage door system 300 housing, for example.

Referring again to FIGS. 1 and 7, various embodiments provide one or more door open sensors 110 that enable the system 100 when the garage door is completely open and disables the system 100 when the garage door is not completely open. The one or more door open sensors 110 may be a switch or any suitable mechanism for sensing whether a garage door is completely open. In various embodiments, a door open sensor 110 is an optical interrupted switch as illustrated, for example, in FIG. 7. Detection that the garage door is completely open may occur when a small flag coupled to the garage door blocks the light transmission of the optical interrupted switch 110. The door open sensor 110 provides an enable signal (e.g., voltage high) on door close reset line 115 to a processor or circuitry 130-170 housed within the system housing 105 or garage door system 300 housing when the garage door is completely open. The door open sensor 110 provides a disable/reset signal (e.g., voltage low) on door close reset line 115 to a processor or circuitry 130-170 when the garage door is not completely open.

Certain embodiments provide one or more motion sensors 120 for sensing motion in and/or around a garage. The motion sensor(s) 120 may comprise passive infrared sensors, microwave sensors, ultrasound sensors, a combination thereof, or any suitable sensor, sensor combination and/or number of sensors. Referring to FIG. 7, the motion sensor(s) 120 may be attached by flexible tubing to the system housing 105 or garage door system 300 housing such that the sensor(s) 120 may be aimed at various positions in or around a garage, for example. Additionally and/or alternatively, motion sensor(s) 120 may be positioned in any suitable manner to the system housing 105, garage door system 300 housing, and/or in or around a garage.

In various embodiments, the system 100 may depend on sensing motion to become active when the system 100 is enabled by the door open sensor 110. For example, after the system 100 is enabled by the door open sensor 110, the system 100 may not be activated until a sensor input is received from motion sensor(s) 120. By depending on a motion sensor input to activate the system 100, the system 100 ensures that a vehicle or person has entered or exited the garage prior to beginning the sequence for automatically closing the garage door.

Referring to FIG. 1, the system 100 comprises one or more timer modules 130, 150, 160 that provide a predetermined time period between motion no longer being detected with the garage door open and a door close activation. Although three timers 130, 150, 160 are illustrated and described, it is contemplated that the present technology may include more or less timers. In certain embodiments, the first timer 130 may begin when motion is no longer detected and may trigger a delay-to-start timer when a predetermined first time period expires. The predetermined first time period may be, for example, 5-15 seconds, or any suitable time period.

Various embodiments provide that the second timer 150 may be a delay-to-start timer 150 that begins when triggered by the first timer 130 and may trigger an alarm timer and a door close activator 170 when a predetermined second time period expires. The predetermined second time period may be, for example, 20-30 seconds, or any suitable time period. In certain embodiments, the delay-to-start timer 150 may be triggered by the first timer 130 via an analog-to-digital converter 140.

Alarm timer 160 may activate alarm 180 for a predetermined third period of time when triggered by the delay-to-start timer, and may deactivate alarm 180 and trigger a door close activator 170 when the predetermined third period of time expires. The predetermined third time period may be, for example, 10-15 seconds, or any suitable time period.

Still referring to FIG. 1, the alarm 180 may provide audio and/or visual alerts to warn nearby users, children, pets and the like, that the garage door is about to close or is closing. For example, the alarm 180 may comprise one or more receivers integrated with the system housing 105, garage door system 300 housing, and/or positioned in any suitable location in or around the garage that may provide a continuous tone, intermittent/pulsed tone, speech message, a combination thereof, or any suitable audible alarm. As another example, the alarm 180 can comprise one or more continuously activated or flashing lights, or any suitable visual alarm, affixed to the system housing 105, garage door system 300 housing, and/or any suitable location in or around the garage.

Various embodiments provide a door close activator 170 operable to close the garage door. The door close activator 170 may trigger the garage door to close in response to trigger inputs received from the delay-to-start timer 150 and/or the alarm timer 160, for example.

Referring to FIG. 7, the system 100 can comprise a switch 190 for turning on/off one or more of the automatic garage door closing system 100 and a garage door system 300 as discussed in more detail below with regard to FIGS. 6A and 6B. The on/off switch 190 may be a toggle switch, push button switch, inline switch, pull chain switch, or any suitable switch. The on/off switch 190 may be wired and/or wireless. The on/off switch 190 can be positioned on the system housing 105, the garage door system 300 housing, a garage wall, a remote control, or any suitable location.

Still referring to FIG. 7, the system 100 comprises a power supply connector 195 for providing power to the system 100. The power supply connector 195 may be an alternating current (AC) connector, direct current (DC) connector, a battery connector, or any suitable connector. In certain embodiments, the power supply connector 195 may couple with a garage door system 300 to draw power from the garage door system 300 power supply.

FIGS. 3-5 are diagrams that illustrate exemplary circuitry for implementing components of the system 100 for automatically closing a garage door of FIG. 1, in accordance with an embodiment of the present technology. Referring to FIG. 3, exemplary door open sensor 110, motion sensors 120, digital-to-analog converter 140 and delay-to start timer circuitry 150 are illustrated.

The door open sensor 110 may be a switch, such as an optical interrupted switch or any suitable sensing device, for sensing whether a garage door is completely open. Detection that the garage door is completely open may occur when a small flag coupled to the garage door blocks the light transmission of the optical interrupted switch 110, for example. A transistor may be switched off, providing an enabling voltage high signal to pin 4 of circuitry 130-170 via door close reset line 115 when the garage door is completely open. When the garage door is not completely open, the transistor may be switched on, grounding pin 4 (i.e., reset state) of circuitry 130-170 via door close reset line 115 such that the outputs of circuitry 130-170 are reset at or near 0 Volts.

The motion sensors 120 can be passive infrared sensors 120 that provide inputs (PIR1 and PIR2) to a diode detector and summing network with an integrator (C1) of front end integrator circuitry 130. Inputs PIR1 and PIR2 quickly charge capacitor (C1) when motion is detected by sensor(s) 120 or when the system 100 is powered on. After motion is no longer detected, capacitor (C1) discharges through resistor (R1) of the front end integrator circuitry 130 over a first predetermined time period.

In certain embodiments, the analog-to-digital converter 140 may be a Schmitt trigger or any suitable analog-to-digital converter that converts the analog input from the front end integrator circuitry 130 to a digital output provided to the delay-to-start timer circuitry 150. Motion detection charges capacitor (C1), which forces the digital output of the Schmitt trigger 140 low and triggers the delay-to-start timer 150. Diode (D3) permits a timing capacitor (C4) to be discharged when motion is detected. The start of the delay-to-start timer 150 is delayed until capacitor (C1) has been sufficiently discharged to allow the Schmitt trigger 140 output (pin 3) to switch high, for example, when motion is no longer detected and the predetermined first time period expires.

In various embodiments, the timing capacitor (C4) charges through resistor (R4) when the Schmitt trigger 140 output (pin 3) switches high. Once the timing capacitor (C4) charges above a threshold, for example, after the predetermined second time period expires, the output (pin 3) of the delay-to-start timer 150 falls and triggers the alarm timer 160 that activates the alarm 180. However, if motion is detected by motion sensors 120, the capacitor (C1) is charged again, toggling the Schmitt trigger 140 and restarting the delay-to-start timer 150 by discharging the timing capacitor (C4) through the diode (D3).

Referring to FIG. 4, exemplary alarm timer circuitry 160 and door close activator circuitry 170 are illustrated. Alarm timer circuitry 160 may comprise timer (555(3)), transistors (Q1 and Q2) and switch (MCT6-2). Transistors (Q1 and Q2) and switch (MCT6-2) are operable to disable the alarm 180 if the device 100 is disconnected from a door switch 310 or if motion sensors 120 detect motion, for example. Timer (555(3)) is configured to run for a predetermined third time period before triggering the door close activator circuitry 170. Door close activator circuitry 170 may comprise timer (555(4)), transistor (Q3) and switch (MCT6-1). The output of the delay-to-start timer 150 and the timer (555(4)) controls the transistor (Q3) to drive the switch (MCT6-1) that is connected across the door switch 310 and triggers the closing of the garage door.

Referring to FIG. 5, an exemplary alarm 180 is illustrated for generating a pulsed alarm using a slow astable circuit (555(5)), a fast astable circuit (555(6)) and a receiver (speaker).

Figure 6A:
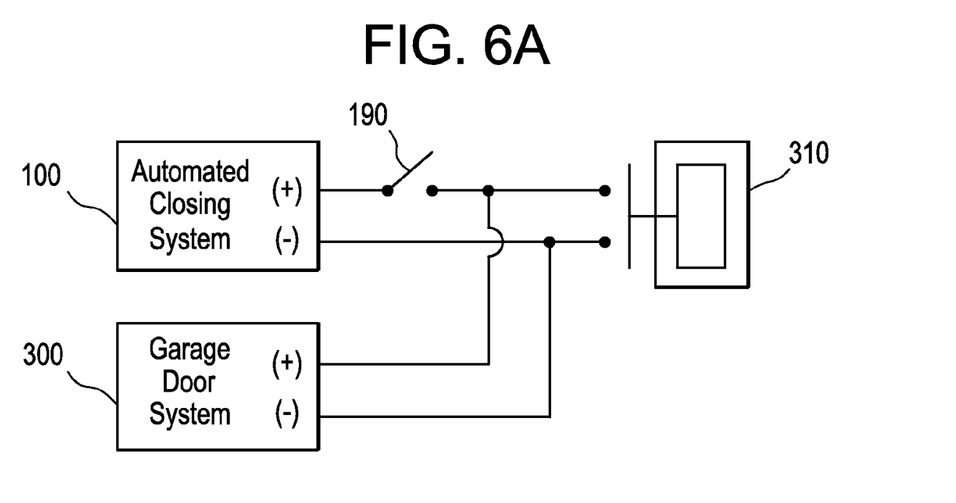
FIG. 6A is a diagram that illustrates an exemplary on/off switch configuration for turning on/off a system for automatically closing a garage door, in accordance with an embodiment of the present technology.

FIG. 6A is a diagram that illustrates an exemplary on/off switch 190 configuration for turning on/off a system 100 for automatically closing a garage door, in accordance with an embodiment of the present technology. Referring to FIG. 6A, an automatic garage door closing device 100, an on/off switch 190, a garage door system 300, and a garage door open/close switch 310 are illustrated. In an embodiment, the on/off switch 190 is positioned on a positive terminal line of the automatic garage door closing device 100 such that switching of the on/off switch 190 turns on or off the automatic garage door closing device 100 without effecting the garage door system 300.

Figure 6B:
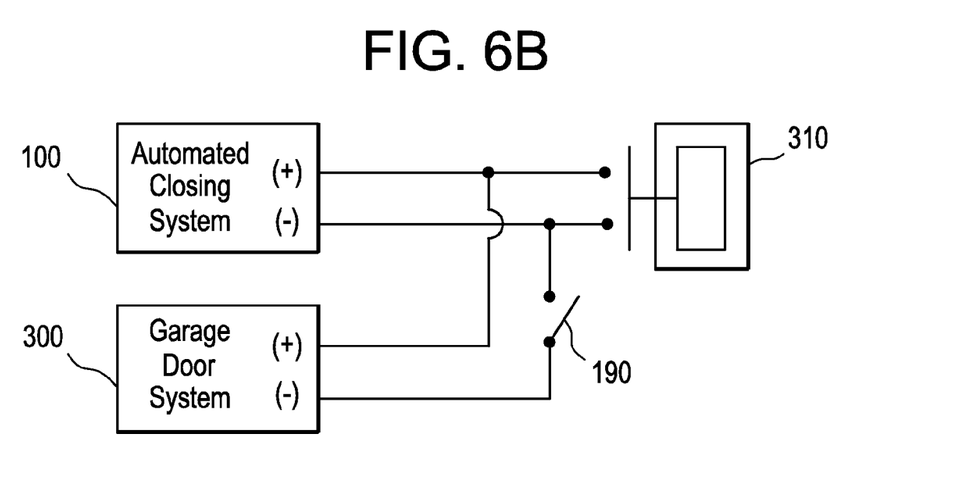
FIG. 6B is a diagram that illustrates an exemplary on/off switch configuration for turning on/off a garage door system and a system for automatically closing a garage door, in accordance with an embodiment of the present technology.

FIG. 6B is a diagram that illustrates an exemplary switch 190 configuration for turning on/off a garage door system 300 and a system 100 for automatically closing a garage door, in accordance with an embodiment of the present technology. Referring to FIG. 6B, an automatic garage door closing device 100, an on/off switch 190, a garage door system 300, and a garage door open/close switch 310 are illustrated. In an embodiment, the on/off switch 190 is positioned on a negative terminal line of the garage door system 300 such that switching of the on/off switch 190 turns on or off both the automatic garage door closing device 100 and the garage door system 300.

Figure 2:
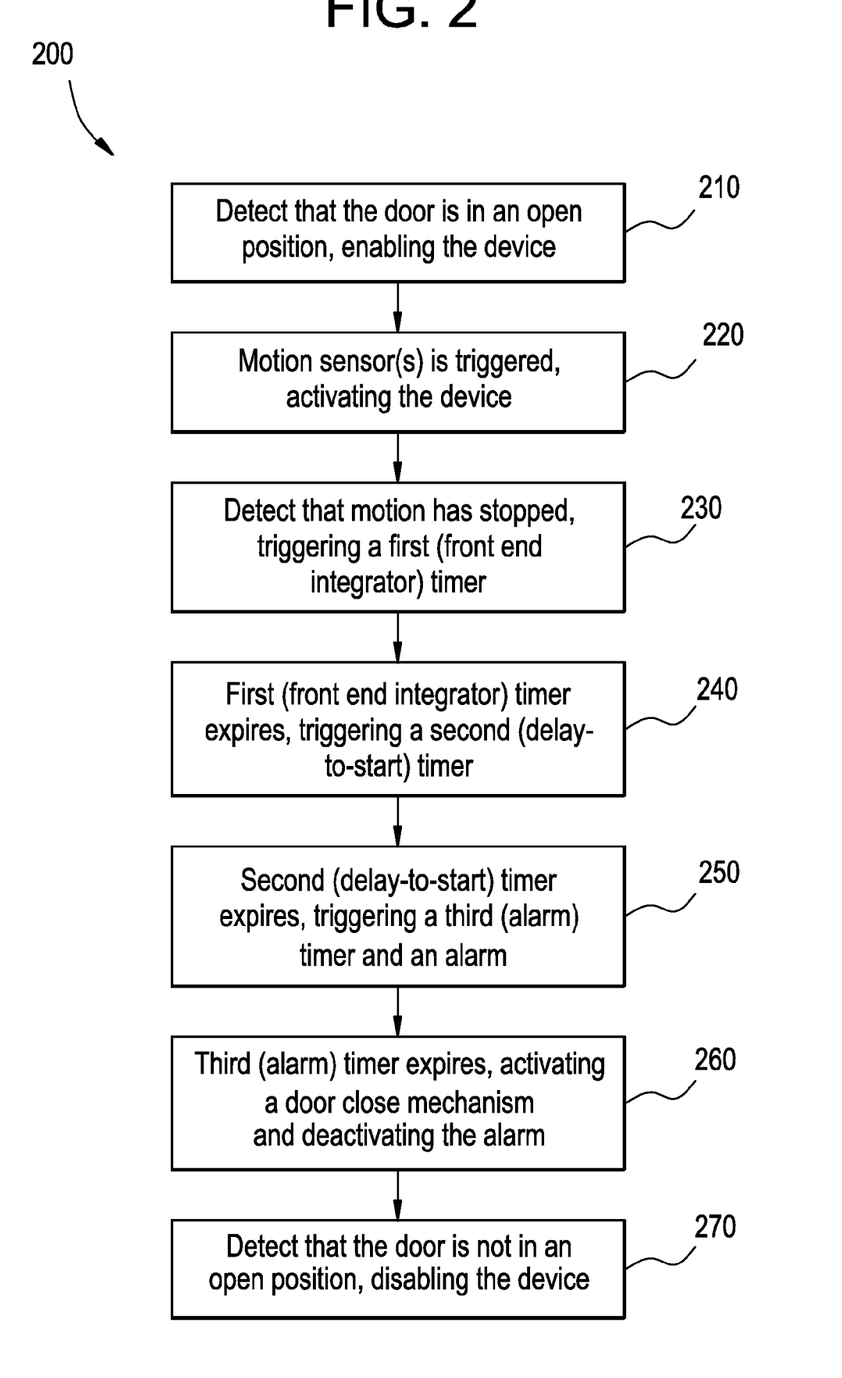
FIG. 2 is a flow diagram that illustrates an exemplary method for automatically closing a garage door, in accordance with an embodiment of the present technology.

FIG. 2 is a flow diagram that illustrates an exemplary method 200 for automatically closing a garage door, in accordance with an embodiment of the present technology. Referring to FIG. 2, there is shown a flow diagram 200, which illustrates exemplary steps for automatically closing a garage door. At 210, the device 100 is enabled when the garage door is detected to be in an open position by a door open sensor 110. At 220, the device 100 is activated when the motion sensor(s) 120 are triggered. At 230, a first (front end integrator) timer 130 is triggered when motion is no longer detected by the motion sensor(s) 120. At 240, a second (delay-to-start) timer 150 is triggered when the first (front end integrator) timer 130 expires. At 250, a third (alarm) timer 160 is triggered, which activates an alarm 180, when the second (delay-to-start) timer 150 expires. At 260, a door close activator 170 is triggered, which deactivates the alarm, when the third (alarm) timer 160 expires. At 270, the device 100 is disabled when the door open sensor 110 detects that the door is no longer completely open. Although the method is described with reference to the exemplary elements of the systems described above, it should be understood that other implementations are possible.

At 210, the door open sensor 110 detects that the garage door is in an open position. For example, detection that the garage door is completely open may occur when a small flag coupled to the garage door blocks the light transmission of the optical interrupted switch 110 as discussed above in connection with FIGS. 1 and 3. Additionally and/or alternatively, any suitable mechanism may be employed for detecting that the garage door is completely open. The door open sensor 110 provides an enable signal (e.g., voltage high) on door close reset line 115 to a processor or circuitry 130-170 housed within the system housing 105 or garage door system 300 housing when the garage door is completely open. As such, certain embodiments provide that the automatic garage door closing device 100 is enabled when the door open sensor 110 detects that the garage door is completely open.

At 220, one or more motion sensors 120 are triggered. For example, the motion sensor(s) 120 may detect a vehicle or person entering or exiting a garage after the garage is completely open. The detection of motion by the motion sensor(s) 120 causes the system 100 to become activated. As an example, the detection of motion by the motion sensor(s) can cause a capacitor (C1) to charge as discussed above with regard to FIG. 3.

In various embodiments, activation of the system 100 does not occur until motion is detected by the motion sensor(s) 120. For example, if a user outside of the garage opens the garage, but prior to entering the garage, decides to get the mail and/or talk to neighbors, etc., the automatic garage door closing device 100 may not begin the garage door closing sequence until the motion detectors detect motion, such as the user entering the garage and proceeding into the user's home, for example.

In certain embodiments, powering the system 100 may trigger the one or more motion sensors 120 irrespective of any motion detected. For example, if the system 100 is powered on, such as when power is restored after a power outage or when an unplugged system 100 is connected to a power source, while the garage door is completely open, the garage door closing sequence may begin despite the motion sensor(s) 120 not detecting motion.

In various embodiments, if the motion sensors 120 detect motion at any time while the device 100 is enabled during method 200, the method 200 will restart at 220. For example, if a user enters a vehicle, opens the garage, and drives out of the garage, the device 100 would be enabled 210 and activated 220 because the door open sensor 110 would detect that the garage door is completely open and the motion sensors 120 would detect the motion of the vehicle. One or more timers 130, 150, 160 are triggered at 230, 240, 250 when motion is no longer detected by the motion sensors, as discussed in more detail below. However, if the motion sensors 120 detect motion after one or more timers 130, 150, 160 have been triggered at 230, 240, 250, the one or more timers 130, 150, 160 reset and the process restarts at 220. As such, the motion sensor(s) 120 provide a safety mechanism to ensure that the user, children or pets, for example, are clear of the door prior to closing the door.

At 230, motion is no longer detected by the motion sensor(s) 120. The absence of motion detected by the motion sensor 120 triggers a first (front end integrator) timer 130. For example, after motion is no longer detected, a capacitor (C1) may discharge through a resistor (R1) of the front end integrator circuitry 130 over a first predetermined time period as discussed above with regard to FIG. 3. As another example, after motion is no longer detected, a processor can start one or more timers that run for a predetermined time period.

At 240, the first (front end integrator) timer 130 expires. The expiration of the first (front end integrator) timer 130 triggers a second (delay-to-start) timer 150. For example, as discussed above in connection with FIG. 3, the start of the second (delay-to-start) timer 150 is delayed until capacitor (C1) has been sufficiently discharged to allow an analog-to-digital converter (e.g., Schmitt trigger) 140 output to switch high, which may occur when motion is no longer detected and the predetermined first time period expires. When the Schmitt trigger 140 output (pin 3) switches high, the second (delay-to-start) timer 150 is triggered and the timing capacitor (C4) begins to charge through resistor (R4). As another example, after a first timer 130 expires and/or after motion is no longer detected, a processor can start one or more timers that run for a predetermined time period.

At 250, the second (delay-to-start) timer 150 expires. The expiration of the second (delay-to-start) timer 150 triggers a third (alarm) timer 160, which activates an alarm 180. For example, as discussed above with reference to FIGS. 3-4, a predetermined second time period may expire when a timing capacitor (C4) charges above a threshold, which causes the output of the delay-to-start timer 150 to fall and triggers the alarm timer 160 that activates the audio alarm. As another example, after the expiration of the first 130 and/or second 150 timer, and/or after motion is no longer detected, a processor can start one or more timers 160 that run for a predetermined time period. Further, the processor may activate an alarm 180 for at least a portion of the predetermined time period.

The alarm 180 may provide audio and/or visual alerts to warn nearby users, children, pets and the like, that the garage door is about to close or is closing. For example, the alarm 180 may comprise one or more receivers integrated with the system housing 105, garage door system 300 housing, and/or positioned in any suitable location in or around the garage that may provide a continuous tone, intermittent/pulsed tone, speech message, a combination thereof, or any suitable audible alarm. An exemplary alarm 180 is illustrated in FIG. 5 for generating a pulsed alarm using a slow astable circuit (555(5)), a fast astable circuit (555(6)) and a receiver (speaker). As another example, the alarm 180 can comprise one or more continuously activated or flashing lights, or any suitable visual alarm, affixed to the system housing 105, garage door system 300 housing, and/or any suitable location in or around the garage.

At 260, the third (alarm) timer 160 expires. The expiration of the third (alarm) timer 160 triggers a door close activator 170 and deactivates the alarm 180. For example, as discussed above in connection with FIG. 4, an alarm timer (555(3)) may be configured to run for a predetermined third time period before triggering door close activator circuitry 170. The door close activator circuitry 170 may comprise timer (555(4)), transistor (Q3) and switch (MCT6-1). The output of the delay-to-start timer 150 and timer (555(4)) controls transistor (Q3) to drive switch (MCT6-1) that is connected across the door switch 310 and triggers the closing of the garage door. As another example, after the expiration of the first 130, second 150 and/or third 160 timers, a processor can close the garage door and deactivate the alarm 180.

At 270, the device 100 is disabled when the door open sensor 110 detects that the door is no longer completely open. For example, with reference to FIGS. 1 and 3 as discussed above, the door open sensor 110 provides a disable/reset signal (e.g., voltage low) on door close reset line 115 to a processor or circuitry 130-170 when the garage door is not completely open.

In certain embodiments, if at any time during method 200 the door open sensor 110 detects that the garage door is no longer completely open, the process will skip to 270 and the device 100 is disabled. As an example, if a user enters a vehicle, opens the garage, and drives out of the garage, the device 100 is enabled 210 and activated 220 because the door open sensor 110 detects that the garage door is completely open and the motion sensors 120 detect the motion of the vehicle. However, if the user manually closed the door by pushing a button 310 on a remote control, for example, the door open sensor 110 detects that the garage door is not completely open and the device 100 is disabled.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

In operation, utilizing a method 200 such as that described in connection with FIG. 2 in accordance with embodiments of the present technology automatically closes a garage door, for example, once a predetermined period of time has lapsed after the garage door was opened and motion is no longer detected.

Various embodiments provide a method for installing an automatic garage door closing device 100. The method may include attaching the device 100 to the garage ceiling, mounting the door open sensor 110, wiring the device 100 to a garage door open/close switch 310, connecting the device power supply connector 195 to a power supply, and aiming the motion sensor(s) 120. Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Accordingly, the present invention may be realized in hardware, software, or a combination thereof. The present invention may be realized in a centralized fashion in at least one system, or in a distributed fashion where different elements may be spread across several interconnected systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Certain embodiments provide an automatic garage door closing system 100. The automatic garage door closing system 100 comprises one or more door open sensors 110, one or more motion sensors 120, one or more timers 130, 150, 160, and a door close activator 170. The one or more door open sensors 110 may be configured to detect whether a garage door is completely open. The one or more motion sensors 120 may be configured to detect motion. The one or more timers 130, 150, 160 may be configured to delay at least one predetermined period of time after the motion is no longer detected. The door close activator 170 may be configured to close the garage door after the delay of the predetermined period of time.

In various embodiments, the one or more door open sensors 110 are configured to enable the one or more timers 130, 150, 160 and the door close activator 170 when the one or more door open sensors 110 detects that the garage door is completely open.

In certain embodiments, the one or more door open sensors 110 comprises an optical interrupted switch.

In various embodiments, the one or more motion sensors 120 are configured to activate the one or more timers 130, 150, 160 when a first motion is detected.

In certain embodiments, the one or more motion sensors 120 comprise two passive infrared sensors.

In various embodiments, the one or more timers 130, 150, 160 and the door close activator 170 are at least one processing device.

In certain embodiments, the one or more timers 130, 150, 160 comprises a first timer 130, a second timer 150 and a third timer 160. The first timer 130 is configured to delay a first predetermined period of time after the motion is no longer detected. The second timer 150 is configured to delay a second predetermined period of time after the first predetermined period of time. The third timer 160 is configured to delay a third predetermined period of time after the second predetermined period of time.

In various embodiments, the first timer 130 comprises a charging capacitor (C1) and a discharging resistor (R1). The charging capacitor (C1) is configured to charge when the motion is detected. The charging capacitor (C1) is configured to discharge through the discharging resistor (R1) during the first predetermined period of time.

In certain embodiments, the automatic garage door closing system 100 comprises an analog-to-digital converter 140. The analog-to-digital converter 140 receives an analog signal from the first timer 130 and provides the second timer 150 with a digital signal.

In various embodiments, the second timer 150 comprises a timing capacitor (C4) and a timing resistor (R4). The timing capacitor (C4) is configured to discharge when the motion is detected. The timing capacitor (C4) is configured to charge through the timing resistor (R4) during the second predetermined period of time.

In certain embodiments, the automatic garage door closing system 100 comprises an alarm 180. The third timer 160 is configured to activate the alarm 180 for a duration of the third predetermined period of time.

In various embodiments, the automatic garage door closing system 100 comprises an alarm 180 that comprises two astable circuits (555(5) and 555(6)) and a speaker configured to generate a pulsed audible alarm.

In certain embodiments, the automatic garage door closing system 100 comprises an on/off switch 190 configured to turn on and off the automatic garage door closing system 100 and a garage door system 300.

In various embodiments, the automatic garage door closing system 100 is integrated with a garage door system 300.

Various embodiments provide a method 200 for automatically closing a garage door. The method 200 may comprise detecting 210 the garage door is completely open using a door open sensor device 110. Further, the method 200 may comprise detecting 220 motion using a motion sensing device 120. The method 200 may also comprise triggering 230, 240, 250 one or more timers 130, 150, 160 after the motion has stopped. Also, the method 200 may comprise automatically closing 260 the garage door at the expiration of a predetermined time period associated with the one or more timers 130, 150, 160.

In certain embodiments, the method 200 for automatically closing a garage door comprises enabling 210 the one or more timers 130, 150, 160 when the door open sensor device 110 detects that the garage door is completely open.

In various embodiments, the method 200 for automatically closing a garage door comprises activating 220 the one or more timers 130, 150, 160 when the motion sensing device 120 detects the motion.

In certain embodiments, the predetermined time period comprises a first predetermined time period, a second predetermined time period and a third predetermined time period. Further, the triggering 230, 240, 250 the one or more timers 130, 150, 160 comprises triggering 230 a first timer 130, triggering 240 a second timer 150, and triggering 250 a third timer 160. The first timer 130 may be triggered 230 for a first predetermined time period after the motion has stopped. The second timer 150 may be triggered 240 for a second predetermined time period after a first predetermined time period has expired. The third timer 160 may be triggered 250 for a third predetermined time period after the second predetermined time period has expired.

In various embodiments, the method 200 for automatically closing a garage door comprises activating 250 an alarm 180 for the third predetermined time period.

In certain embodiments, the method 200 for automatically closing a garage door comprises deactivating 260 the alarm 180 after the third predetermined time period has expired.

In various embodiments, the method 200 for automatically closing a garage door comprises disabling 270 the one or more timers 130, 150, 160 when the door open sensor device 110 detects that the garage door is not completely open.

Certain embodiments provide a non-transitory computer-readable medium encoded with a set of instructions 200 for execution on a computer. The set of instructions 200 may comprise a door detection routine 210 configured to detect when a garage door is completely open. The set of instructions 200 may comprise a motion detection routine 220 configured to detect motion. The set of instructions 200 may comprise a timer routine 230, 240, 250 configured to delay a predetermined time period after the motion has stopped. The set of instructions 200 may comprise a close door routine 260 configured to close the garage door at the expiration of the predetermined time period.

In various embodiments, the non-transitory computer-readable medium encoded with the set of instructions 200 comprises a device enabling routine 210 configured to enable execution of the timer routine 230, 240, 250 and the close door routine 260 when the door detection routine 210 detects that the garage door is completely open.

In certain embodiments, the non-transitory computer-readable medium encoded with the set of instructions 200 comprises a device activation routine 220 configured to enable execution of the timer routine 230, 240, 250 when the motion detection routine 220 detects the motion.

In various embodiments, the predetermined time period comprises a first predetermined time period, a second predetermined time period and a third predetermined time period. Further, the timer routine 230, 240, 250 comprises a first timer routine 230, a second timer routine 240 and a third timer routine 250. The first timer routine 230 is configured to delay for a first predetermined time period after the motion has stopped. The second timer routine 240 is configured to delay for a second predetermined time period after a first predetermined time period has expired. The third timer routine 250 is configured to delay for a third predetermined time period after the second predetermined time period has expired.

In certain embodiments, the non-transitory computer-readable medium encoded with the set of instructions 200 comprises an alarm activation routine 250 configured to activate an alarm 180 for the third predetermined time period.

In various embodiments, the non-transitory computer-readable medium encoded with the set of instructions 200 comprises an alarm deactivation routine 260 configured to deactivate the alarm 180 after the third predetermined time period has expired.

In certain embodiments, the non-transitory computer-readable medium encoded with the set of instructions 200 comprises a device disabling routine 270 configured to disable execution of the timer routine 230, 240, 250 and the close door routine 260 when the device disabling routine 270 detects that the garage door is not completely open.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An automatic garage door closing system comprising:
   at least one door open sensor operable to detect whether a garage door is completely open;
   at least one passive infrared sensor operable to be focused in a garage and operable to detect motion within the garage, wherein the at least one passive infrared sensor is operable to activate at least one timer if the motion is detected by the at least one passive infrared sensor;
   the at least one timer operable to start running for a predetermined period of time only after the motion is no longer detected by the at least one passive infrared sensor, wherein the at least one timer is operable to reset if the motion is detected by the at least one passive infrared sensor during the predetermined period of time and then start running for the predetermined period of time only after the motion is no longer detected by the at least one passive infrared sensor; and
   a door close activator operable to close the garage door after the predetermined period of time.

2. The system of claim 1, wherein the at least one door open sensor is operable to enable the at least one timer and the door close activator if the at least one door open sensor detects that the garage door is completely open.

3. The system of claim 1, wherein the at least one door open sensor comprises an optical interrupted switch.

4. The system of claim 1, wherein the at least one passive infrared sensor comprises two passive infrared sensors.

5. The system of claim 1, wherein the at least one timer and the door close activator are part of at least one processing device.

6. The system of claim 1, wherein the at least one timer comprises:
   a first timer operable to delay a first predetermined period of time after the motion is no longer detected,
   a second timer operable to delay a second predetermined period of time after the first predetermined period of time, and
   a third timer operable to delay a third predetermined period of time after the second predetermined period of time,
   wherein the predetermined period of time is the sum of the first, second, and third predetermined periods of time.

7. The system of claim 6, wherein the first timer comprises a charging capacitor and a discharging resistor, the charging capacitor operable to charge if the motion is detected, and the charging capacitor operable to discharge through the discharging resistor during the first predetermined period of time.

8. The system of claim 6, comprising an analog-to-digital converter, wherein the analog-to-digital converter receives an analog signal from the first timer and provides the second timer with a digital signal.

9. The system of claim 6, wherein the second timer comprises a timing capacitor and a timing resistor, the timing capacitor operable to discharge if the motion is detected, and the timing capacitor operable to charge through the timing resistor during the second predetermined period of time.

10. The system of claim 6, comprising an alarm, wherein the third timer is operable to activate the alarm for a duration of the third predetermined period of time.

11. The system of claim 1, comprising an alarm that comprises two astable circuits and a speaker operable to generate a pulsed audible alarm.

12. A garage door system comprising the automatic garage door closing system of claim 1 and a switch operable to turn on and off the automatic garage door closing system and the garage door system.

13. A garage door system comprising the automatic garage door closing system of claim 1, wherein the automatic garage door closing system is integrated with the garage door system.

14. A method for automatically closing a garage door, the method comprising:
   detecting that the garage door is completely open with a door open sensor device;
   detecting motion in a garage with at least one passive infrared sensor operable to be focused in the garage;
   activating, by the at least one passive infrared sensor, at least one timer if the at least one passive infrared sensor detects the motion;
   starting to run the at least one timer for a predetermined period of time only after the motion is no longer detected by the at least one passive infrared sensor;
   resetting the at least one timer if the motion is detected by the at least one passive infrared sensor during the predetermined period of time and starting to run the at least one timer for the predetermined period of time only after the motion is no longer detected by the at least one passive infrared sensor; and
   automatically closing the garage door after the predetermined period of time has expired.

15. The method of claim 14, comprising enabling the at least one timer if the door open sensor device detects that the garage door is completely open.

16. The method of claim 14, wherein the predetermined period of time comprises a first predetermined time period, a second predetermined time period and a third predetermined time period, and wherein the step of starting to run the at least one timer comprises:
   triggering a first timer to run for the first predetermined time period after the motion is no longer detected by the at least one passive infrared sensor,
   triggering a second timer to run for the second predetermined time period after the first predetermined time period has expired, and
   triggering a third timer to run for the third predetermined time period after the second predetermined time period has expired.

17. The method of claim 16, comprising activating an alarm for the third predetermined time period.

18. The method of claim 17, comprising deactivating the alarm after the third predetermined time period has expired.

19. The method of claim 14, comprising disabling the at least one timer if the door open sensor device detects that the garage door is not completely open.

* * * * *